United States Patent [19]

Nozue et al.

[11] Patent Number: 5,745,730
[45] Date of Patent: Apr. 28, 1998

[54] APPARATUS AND METHODS FOR IMPLEMENTING DEDICATED CACHE FLUSHING

[75] Inventors: Hiroshi Nozue, Chiba-ken; Yoshio Masubuchi, Kanagawa-ken, both of Japan

[73] Assignee: Kabushiki Kaisha Toshiba, Kanagawa-ken, Japan

[21] Appl. No.: 653,909

[22] Filed: May 28, 1996

[30] Foreign Application Priority Data

Jun. 19, 1995 [JP] Japan .................................. 7-151732

[51] Int. Cl.[6] .................................................. G06F 12/12
[52] U.S. Cl. ........................... 395/462; 395/471; 395/473; 395/468
[58] Field of Search .................................. 395/471, 473, 395/462, 468

[56] References Cited

U.S. PATENT DOCUMENTS

| 5,146,603 | 9/1992 | Frost et al. ........................... 395/470 |
|---|---|---|
| 5,375,216 | 12/1994 | Moyer et al. ......................... 395/450 |
| 5,414,827 | 5/1995 | Lin .......................................... 395/462 |
| 5,479,630 | 12/1995 | Killian ................................... 395/403 |
| 5,524,233 | 6/1996 | Milburn et al. ....................... 395/468 |
| 5,553,264 | 9/1996 | Özverem et al. ..................... 395/462 |
| 5,636,374 | 6/1997 | Rodgers et al. ...................... 395/571 |

*Primary Examiner*—Tod R. Swann
*Assistant Examiner*—J. Peikari
*Attorney, Agent, or Firm*—Finnegan, Henderson, Farabow, Garrett & Dunner, L.L.P.

[57] ABSTRACT

A bus interface is connected to a system bus for monitoring a bus command indicating that data is updated on a cache memory of a processor. If the data is updated on the cache memory, the external tag storage device stores state information to indicate the update of the data and a physical address corresponding to the updated data. An external tag reading device reads the state information stored in the external tag storage device, when the updated data on the cache memory is stored in a main memory. A bus command for flushing the updated data from the cache memory to the main memory is generated, based on the state of the tag read out from the external tag storage device. An invalid bus command generation device outputs an invalid bus command to the system bus through a FIFO.

20 Claims, 13 Drawing Sheets

```
cflush:
         li      $4, 0            # start block address
         li      $5, CHCHE_SIZE   # the number of blocks loop:
         Cache   0x17, 0 ($4)     # 2nd cache invalidate  ⎫
         addu    $5, $5, -1       # decrement cache size  ⎬ PROCESSING LOOP
         bne     $5, 0, loop      #                       ⎪
         addiu   $4, $4, 64       # increment block address ⎭ j       $31              # return subroutine
         nop
```

(PRIOR ART)

*Fig. 1*

APPARATUS AND METHODS FOR IMPLEMENTING DEDICATED CACHE FLUSHING

FIELD OF THE INVENTION

This invention relates to a computer system with a cache memory, and in particular, flushing contents of the cache memory.

BACKGROUND OF THE INVENTION

A cache memory that temporarily stores data used by a processor is widely used to speed up a computer system. Recent high-speed processors employ a large cache memory of copy-back type.

A copy-back type cache memory is characterized by the following mechanism. When a processor executes a store instruction, updated data is not written into a main memory but is held only in the cache memory. The updated data is written back into the main memory sometime by the following three events.

One is that new data must is stored in the cache block of the cache memory for the updated data, which is called replacement. Another is that a coherent read command is issued on a system bus connected to another cache memory or an I/O device. The other one is that the updated data should be written back for some reasons. A write back operation is also referred to as a cache flush operation.

For example, there are many I/O devices which do not support coherent read commands. These I/O devices use only non-coherent read commands, which always can only data from the main memory even though updated data may be present in a cache memory. Hence, a processor must write back the updated data into the main memory from the cache memory before the processor causes makes that kind of I/O device to read the appropriate data.

Some checkpoint/rollback computer systems also require the third type of write back operation. Tese systems record a checkpoint in the main memory periodically. A checkpoint is a state from which the computer system can restart the data processing when a fault occurs thereon.

When a fault occurs, the computer system rolls back the main memory to the last checkpoint and restarts the data processing using the information recorded within the main memory. For this kind of computer, all the updated data in the cache memory must be written back into the main memory at each checkpoint.

The third type of write back operation is performed in the prior art by processor instructions which affect the cache memory.

For example, FIG. 1 shows a main loop of a write back operation in the case of a MIPS R4000 processor. One time execution of the loop invalidates one cache block of the cache memory. Updated data is written back to the main memory (if any) and then the state of the cache block is turned invalid.

One time execution of the loop takes six processor cycles or three bus cycles if the cache block does not contain updated data and more cycles if the cache block contains updated data.

The cache flush operation for all cache blocks of the cache memory takes a long time because the cache memory capacity is very large. The processor cannot execute any data processing during the period of this cache flush operation.

SUMMARY OF THE INVENTION

An object of the present invention is to shorten the time required to process the cache flush operation by the processor of a computer system.

A further object of the present invention is to provide a cache flush device to improve system performance.

In accordance with the present invention, the foregoing objects, among others, are achieved by providing a computer system for flushing the contents of a cache memory, comprising a processor with a cache memory of a copy-back type, the processor having a bus snoop function, a main memory, a system bus for connecting the processor to the main memory, monitor means, connected to the system bus, for monitoring a bus command on the system bus, storage means, responsive to the monitor means, for storing, when data is updated on the cache memory, a physical address corresponding to the updated data and state information indicating that the data in the cache memory is in an updated state, reading means for reading the state information stored in the storage means, when the updated data on the cache memory is stored in the main memory, and command output means, connected to the system bus, for outputting an invalid bus command to request a transmission of the updated data from the cache memory to the main memory if the state information indicates that the data in the cache memory has been modified by the processor.

There has also been provided, in accordance with yet another aspect of the present invention, a method of flushing the contents of a cache memory, the method comprising the steps of monitoring a bus command on a system bus, storing in storage means, when data is updated on the cache memory, a physical address corresponding to the updated data and state information indicating that the data in the cache memory is in an updated state, reading the stored state information, when the updated data on the cache memory is stored in a main memory, and outputting to the system bus an invalid bus command to request a transmission of the updated data from the cache memory to the main memory if the data in the cache memory has been modified.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is one embodiment of a program to explain a cache flush operation of the prior art.

DESCRIPTION OF THE PREFERRED EMBODIMENTS

Figure 2:
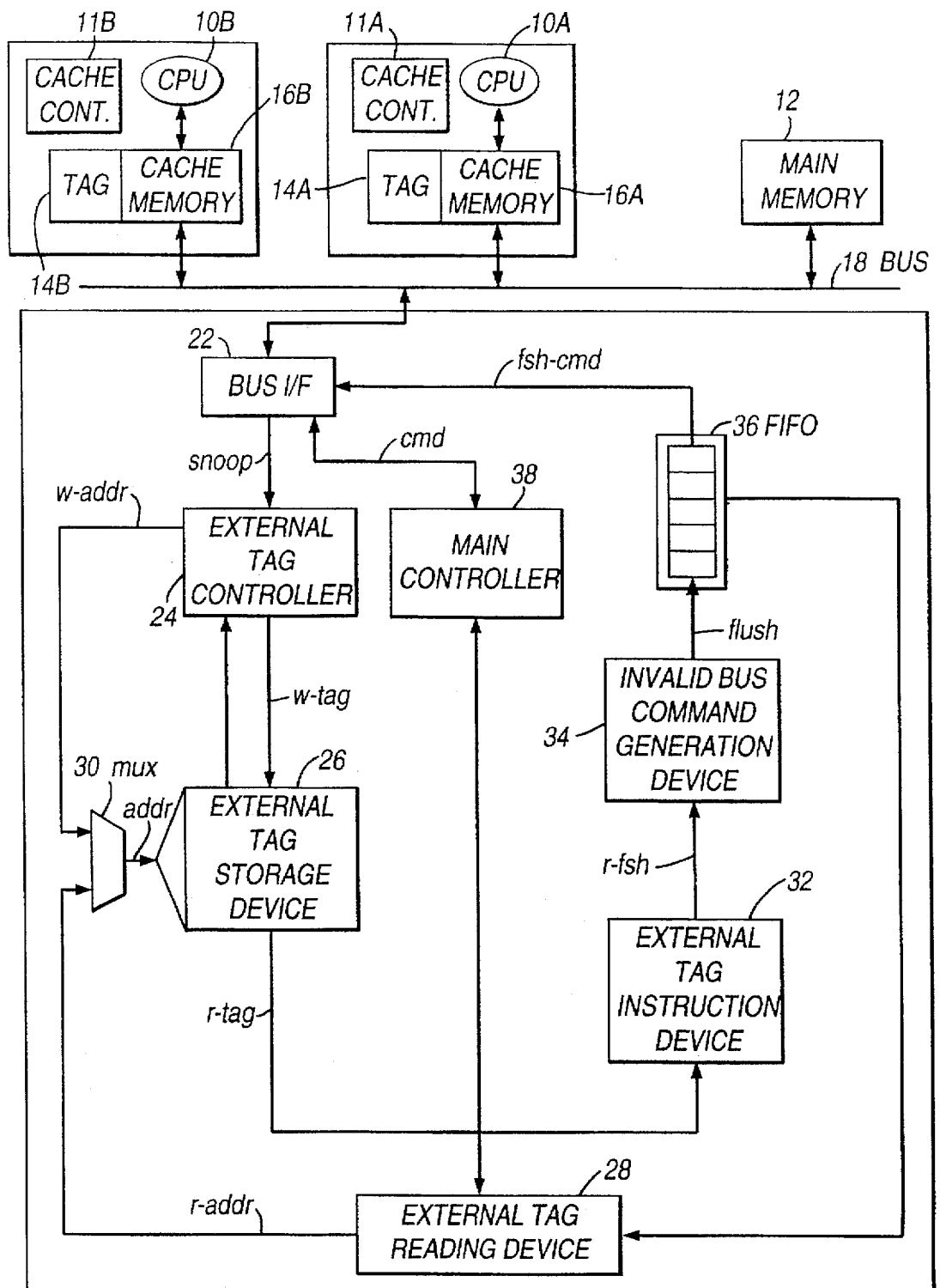
FIG. 2 is a block diagram of a computer system, according to one embodiment of the present invention.

Hereafter, one embodiment of this invention is explained, referring to the drawings. The computer system has one processor shown in FIG. 2. The processor 10 has a cache memory 16 for temporarily storing at a specified portion of the content of a main memory 12, the cache memory 16 including a plurality of cache blocks 17, and a cache tag 14 for storing information that shows the state of all the cache blocks 17 of the cache memory 16, and a cache controller 11 for controlling the cache memory and the cache tag and writing back a dirty cache block into the main memory. As used in this application, the term "dirty" cache block refers to a cache block containing data which has been modified.

The processor 10 including the cache tag 14, the cache memory 16 and the cache controller 11 is connected to the main memory 12 through a system bus 18. A cache flush device 20 is connected to the system bus 16.

When the processor 10 changes the state of data on the cache memory 16, the processor 10 informs other devices connected to the system bus 18 of the changed state and the physical address of the data in the cache memory 16. In addition, when the changed state of the data in another cache memory is reported from other devices, and there is cached data which matches the notified address, the processor 10 executes any necessary operation on the cached data. For instance, the coherency of data on cache memories may be maintained by a snoop function.

The processor 10 has a snoop function of a copy-back type. The processor generates a bus command to invalidate the shared data stored in the cache memories of other processors, when the data stored in the cache memory 16 has been changed by the processor 10.

When the processor 10 receives an invalid bus command from another processor and target data exists in the cache memory 16, the processor 10 invalidates the shared data stored in the cache memory 16 if the processor 10 contains data that corresponds to the target address. As used herein, the term "target" data refers to the shared data indicated by another processor. In addition, the processor 10 outputs the data to the other processor or the main memory 12, if the cache data that corresponds to the target address was changed by the processor 16.

The cache flush device 20 of this invention has main controller 38, a bus interface circuit 22, an external tag controller 24, an external tag memory device 26, an external tag reading device 28, a multiplexer 30, an external tag inspection device an invalid bus command generation device 34, and FIFO 36, as shown in FIG. 2.

The bus interface circuit 22 in the cache flush device 20 is an interface for the system bus 18 and has the following three functions. First, the bus interface circuit 22 receives an invalid bus command on the system bus 18 which invalidates the state change of the cached data, and sends the invalid bus command to the external tag controller 24. The invalid bus command includes a physical address of the target data and command to execute processing. Second, the bus interface circuit 22 receives a command from the cache flush device 20, and sends it to the main controller 38. The bus commands from the cache flush device 20 include an access command for reading or writing to internal registers of the main controller 38. For example, the internal registers include a start address register and a loop count register. Third, the bus interface circuit 22 receives an invalid bus command (fsh-cmd) through FIFO 36, which is generated by the invalid bus command generation device 34, and outputs the invalid bus command onto the system bus 18.

The external tag controller 24 has the following three functions for simulating the cache tags of the cache memory 16. First, the external tag controller 24 gives a tag address (w-addr) to the external tag storage device 26 through the multiplexer 30, and reads the corresponding tag from the external tag storage device 26. Second, the external tag controller 24 interprets the bus command provided by the bus interface 22. The external tag controller 24 generates a new tag, according to the old tag read from the external tag storage device 26 and this interpretation. Third, the external tag controller 24 outputs the tag address (W-addr) to the external tag storage device 26, and stores the new tag (w-tag) in the external tag storage device. This new tag is the same as the tag stored in the cache tag 14 connected to the processor 10. The external tag controller 24 generates a new tag from the content of the bus command and the content of the external tag storage device 26, according to processor cache, to maintain the same tag information as in the cache tag 14 within the external cache tag storage device 26.

The external tag storage device 26 stores tags (w-tag) generated by the external tag controller 24 generated. The content of the tags varies, depending on processor cache control architecture. For instance, the content of the tags way consist of a physical address, 2 or 3 bit state which represents (Modified/Exclusive/Shared/Invalid) and an ECC (error-correcting code) for error detection and correction.

Here, a description of a device for the ECC has been omitted because it is unrelated to this invention. In this invention, whether a cache block has a dirty state (Modified) or not is important. Therefore, the external tag storage device 26 may only store one bit to show a dirty state. Hereafter, to most easily explain easily in this embodiment, if has been assumed that only one bit showing a dirty state is stored in the external tag storage device 26. However, the complete state of several bits can be stored in the external tag storage device 26.

When the MESI protocol is used, the processor 10 does not issue a bus command which notifies the state information from E (exclusive) state to M (modified) state. This is because there is no cache block with the same address in the other caches connected to the system bus 18. In this case, the cache flush device 20 does not know that the tag of the cache block has been changed. To avoid such situations, when a read bus command from the processor 10 is output onto the system bus 18, the bus interface circuit 22 makes a response which indicates that the data is being shared by another cache memory. The processor 10 puts the cache block in a shared state (S) by this response. As a result, when the processor changes the cache block (the state changes from S (shared) to M (modified)), the processor 10 outputs an invalid bus command onto the system bus 18. The cache flush device 20 receives the invalid bus command, and knows that the state of the cached data has been changed from S (Shared) to M (Modified), the state which is recorded in the external tag storage device 26.

The external tag storage device 26 mainly executes the following two operations. First, the external tag storage device 26 receives an address (w-addr) and a tag (w-tag) from the external tag controller 24 and these are written into the external tag storage device 26. Second, the external tag storage device 26 receives an address (r-addr) from the external tag reading device 28 through the multiplexer 30, reads a tag (r-tag) from the external tag storage device 26, and outputs it to the external tag inspection device 32.

The memory capacity of the external tag storage device 26 is the size of all tags of the cache memory connected to the system bus 18. Since the cache flush device 20 does not need a storage for the cached data, the memory capacity of the external tag storage device 26 may be recorded much less, compared with the capacity of the cache memory 16.

The external tag reading device 28 generates a tag address (r-addr) to read a tag from the external tag storage device 26 and outputs it to the external tag storage device 26 through the multiplexer 30. The external tag read device 28 receives the start address and the loop count of a cache flush operation through the main controller 38.

The external tag reading device 28 executes following operations. First, the external tag reading device 28 reads the start address and the loop count. If the readout loop address is zero, the external tag reading device 28 stores zero in a flush start bit of the main controller 38, and the cache flush operation ends. If the number of the loop count is not zero, the external tag reading device 28 outputs the start address (r-addr) to the external tag storage device 26 through the multiplexer 30. The external tag reading device 28 increments the start address by the size of the cache block and writes the address in the start address register of the main controller 38. The start address is given as a modulus of the number of cache blocks of the external tag storage device 26. That is, when the start address increases from the maximum address of the external tag storage device 26, the start address returns to the minimum address of the external tag storage device 26. The external tag reading device 28 decreases the number of the loop count. If the loop count becomes zero, the original loop count before start the operation is written in the loop count register and zero is written in the flush start bit. Then the cache flush operation is ended. If the decremented loop count is not zero, the external tag reading device 28 writes the decremented loop count in the loop count register of the main controller 38.

The multiplexer 30 selects a request for writing a tag by the external tag controller 24, and a request for reading a tag by the external tag reading device 28. The multiplexer 30 gives a priority to the tag writing request by the external tag controller 24, if the two requests are generated at the same time.

The external tag inspection device 32 determines whether the corresponding cache block is dirty, referring to the tag (r-tag) readout from the external tag storage device 26. The external tag inspection device 32 outputs a cache flush command generation request (r-fsh) and a physical address tag that corresponds to the tag of a dirty state among tags (r-tag) read from the external tag storage device 26. If the tag does not indicate dirty, the external tag inspection device 32 does not output a cache flush command generation request (r-fsh).

The invalid bus command generation device 34 receives a cache flush command request with a physical address tag (r-fsh) output from the external tag inspection device 32, and outputs a cache flush command (flush) for flushing the corresponding cache block by using the received physical address tag. For example, the cache flush command may be a coherent bus invalidate command.

FIFO 36 is a device for relieving a time difference between a cache flush command (flush) input almost every cycle from the invalid bus command generation device 34 because of the pipeline operation, and a cache flush command (fsh-cmd) output onto the system bus 18 every few cycles. When the accumulated cache flush command exceeds the constant capacity of FIFO 36, FIFO 36 temporarily stops the operation of the external tag reading device 28 to control the generation of the cache flush command. If the accumulated cache flush command decreases below the constant capacity of FIFO 36, FIFO 36 restarts the operation of the external tag reading device 28.

The main controller 38 controls each part of the cache flush device 20, according to a command (cmd) given by the processor 10 through the system bus 18. The main controller 38 includes the start address register, the loop count register, and the flush start bit (not shown). The main controller 38 has the following functions. First, the main controller 38 initializes the external tag reading device 28, the external tag inspection device 32, and the invalid bus command generation device 34 and FIFO 36. Second, the main controller 38 sets an initial value (start address) of a tag address (r-addr) given to the external tag reading device 28 and the loop count into the start address register and the loop count register, respectively. Third, when the flush start bit is set to "one" by processor 10, the main controller 38 starts the external tag reading device 28 so that the cache flush operation can begin. Fourthly, the main controller 38 controls the external tag reading device 28 to stop the generation of the cache flush command. In this case, the flush start bit is set to "zero" by the external tag reading device 28 before the external tag reading device 28 stops the operation. Fifthly, the main controller 38 reads the start address and the loop count from the start address register and the loop count register. The readout values are sent to the processor 10. As functions other than the above-mentioned, the main controller 38 also can have the function of informing the number of the generated flush commands to the processor 10 and the function of starting the external tag reading device 28 every few cycles by using a bus clock divider.

Figure 3:
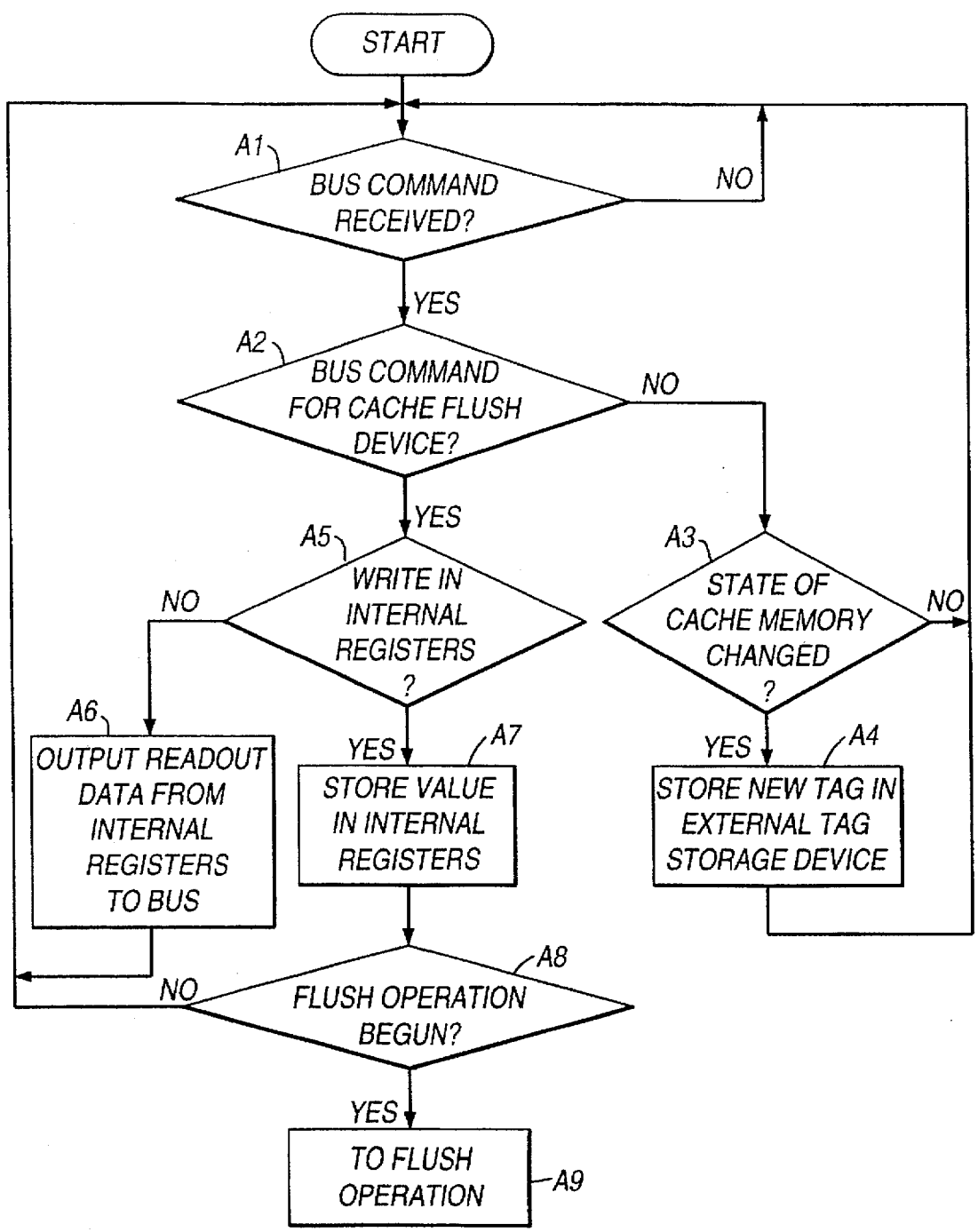
FIG. 3 is a flow chart to explain the operation of the cache flush device of the present invention when the computer system operates normally.

Next, the operation of this embodiment is explained, referring to FIG. 3. While the computer system is normally working, the bus interface circuit 22 snoops a bus command on the system bus 18 and gives the snooped result to the external tag controller 24 (step A1).

The external tag controller 24 distinguishes the kind of the bus command given from the bus interface circuit 22 (step A2). When it is a bus command indicating that the state of the cache memory has been changed (step A3), the external tag controller 24 generates a new tag (w-tag). The external tag controller 24 stores the new tag in the external tag storage device 24, according to a tag address (w-addr) (step A4). The external tag controller 24 stores a physical address corresponding to the cache block and the state of the cache in the external tag storage device 24. The change of the state of the cache is different according to processor architecture. However, for instance, it is possible to define the state of the cache in R4000 as following.

TABLE 1

| Transaction | A Dirty bit |
|---|---|
| Coherent Read Invalidate | any → Yes |
| Coherent Invalidate (from Processor) | |

TABLE 1-continued

| Transaction | A Dirty bit |
| --- | --- |
| Coherent Read | |
| Coherent Invalidate (from Cache Flush Device) | any → No |
| copy-back Write (Read with Write Forcecoming) | |
| Others. | Unchanged |

Coherent Read Invalidate=If there is no corresponding data in the cache block initially when a processor writes data into the cache block, the processor reads the data from the main memory, stores it in the cache memory, and changes the data in the cache block. The processor informs the other processors of a coherent invalidate command. If the other processors hold the corresponding data in other cache memories, the other processors invalidate the data of the cache blocks.

Coherent invalidate=if a processor changes data in a cache memory, the processor informs the other processors, so that the other processors discard the corresponding data in their cache memories.

Coherent Read=the processor reads data from the main memory, or from the cache memory of another processor if the corresponding data is stored in the cache memory with a modified state.

Coherent Invalidate (from Cache Flush Device)=as an example of R4000, the cache flush device of this invention outputs a cache flush command to cache controllers of the processors. If a cache memory holds the corresponding data in a modified state, the data is written back to the main memory.

Write (Read with Write Forcecoming)=The content of the cache memory is written into the memory.

Figure 4:
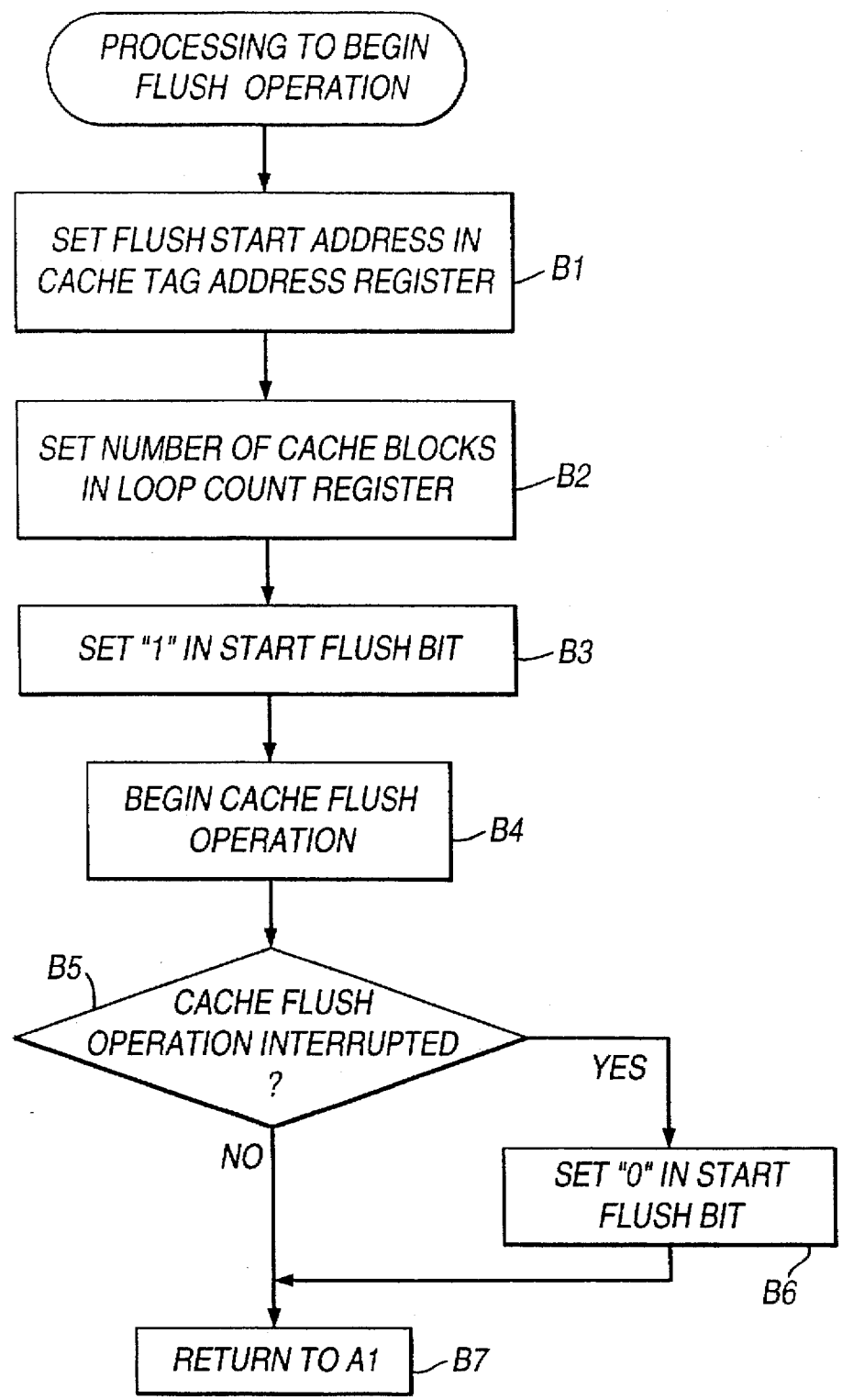
FIG. 4 is a flow chart to explain the operation of the cache flush device of the invention, according to the instruction of the processor.

Next, the operation of the cache flush device 20 to execute the cache flush operation will be explained as follows, referring to FIG. 4.

First, when the cache flush device 20 is reset, the main controller 38 sets the default value in the start address register and the loop count register. Thus, the main controller 38 sets a minimum address of a cache block as the start address and the number of cache blocks as a loop count.

The processor 10 outputs a bus command for setting the value in an internal register of the main controller 38. If the bus command received by the bus interface circuit 22 is for the setting operation of the internal register in the main controller 38 (step A5), the main controller 38 stores the value in the internal register, according to the content of the bus command (step A7). Thus, the main controller 38 sets the start address register and the loop count register, according to the bus commands from the processor 10 (steps B1–B2).

On the other hand, if the received bus command is for the cache flush device and it is not a setting operation to the internal registers in step A5, data readout from the internal registers in the main controller 38 is output to the system bus 18.

The processor 10 stores a "one" in the flush start bit of the main controller 38, to indicate the cache flush operation (step B3). If "one" is stored in the flush start bit, the main controller 38 begins the cache flush operation (steps B4 and A5–A9).

If the cache flush operation needs to be interrupted, the processor 10 stores zero in the flush start bit. The processing of the cache flush device 20 returns to the step A1 in FIG. 3 (steps B5–B7).

Figure 5A:
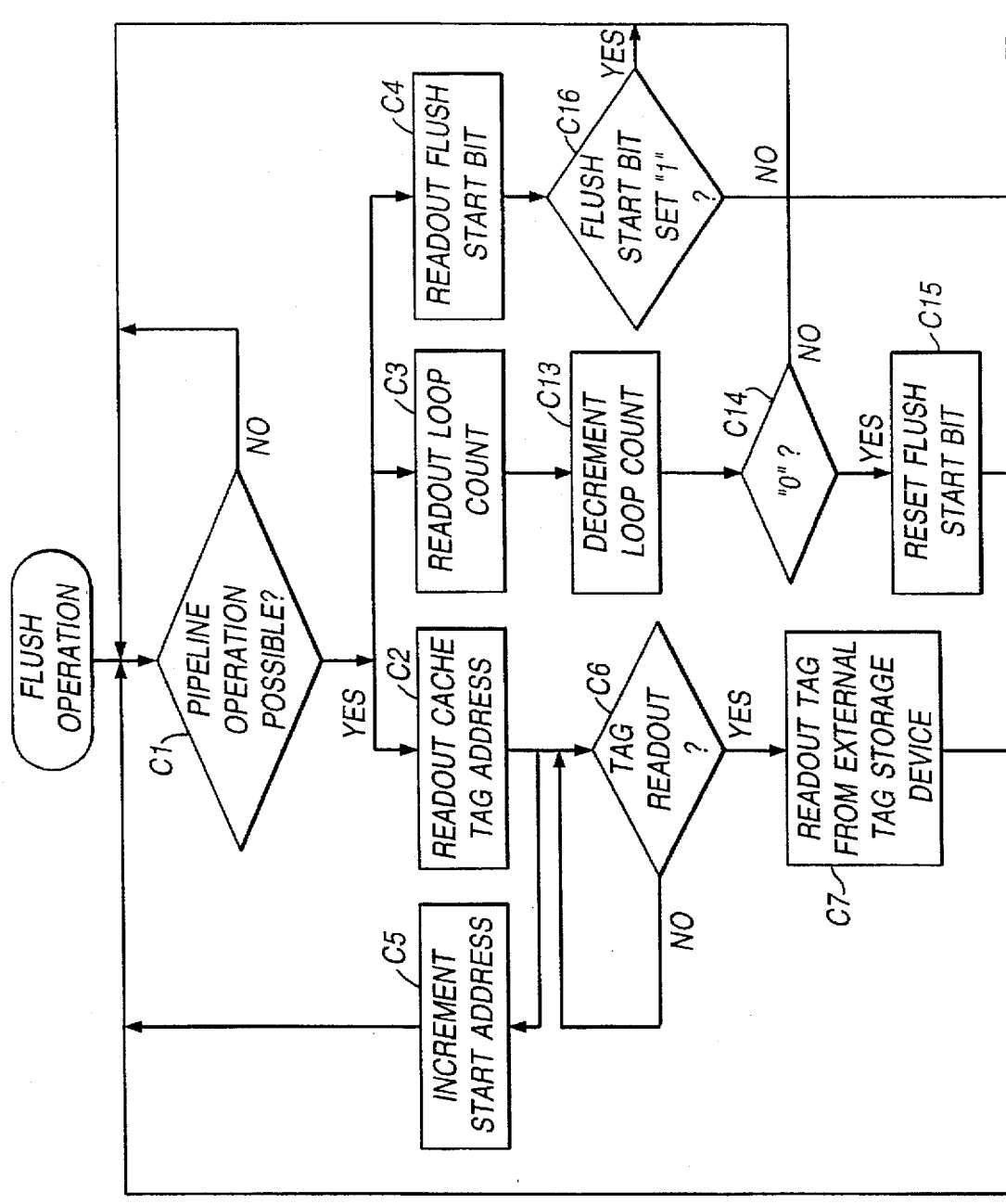
FIG. 5 is a flow chart to explain the cache flush operation of the invention.
Figure 5B:
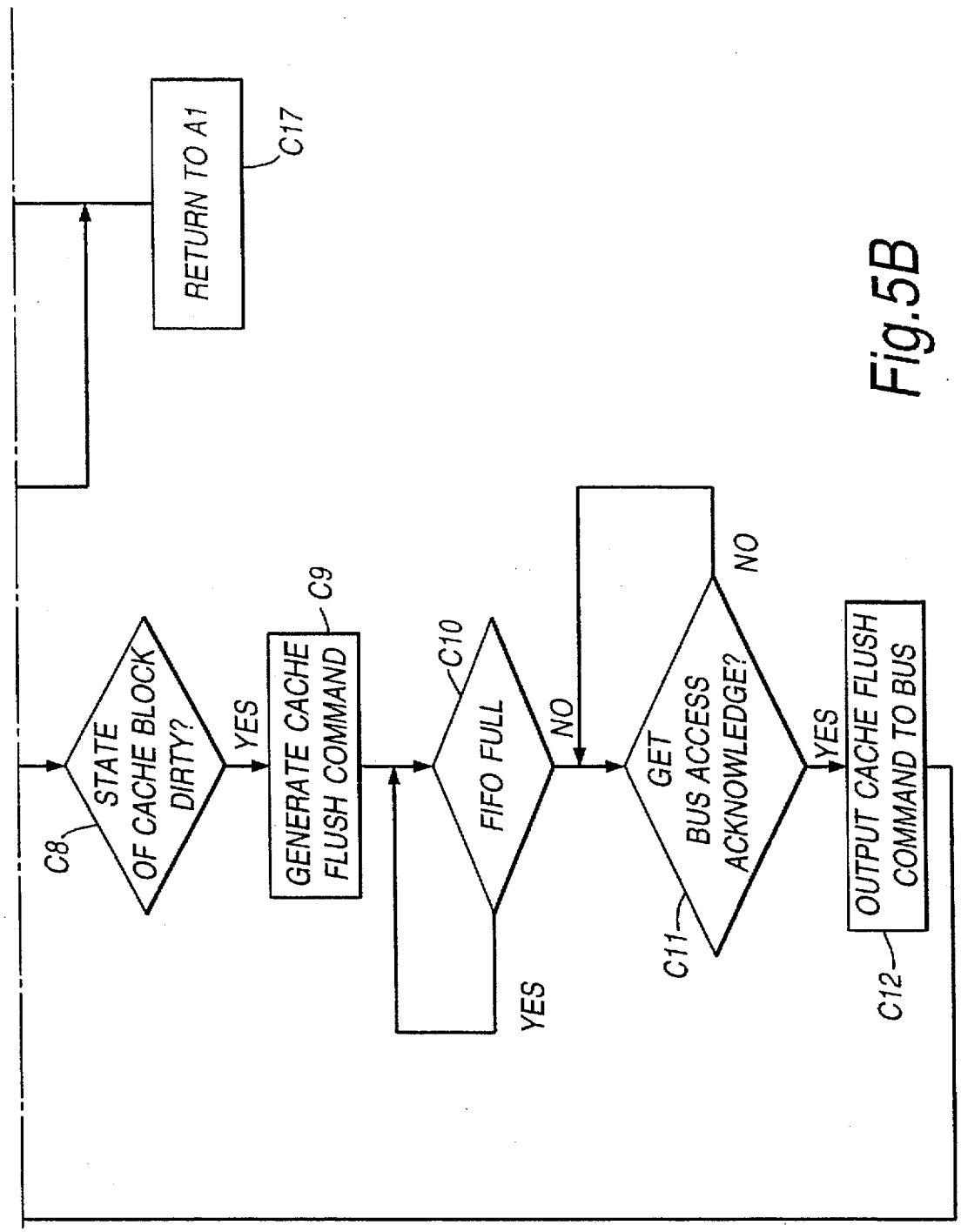

FIG. 5 is a flow chart to explain the operation of the cache flush of this invention. The cache flush operation repeats the following cycle.

Figure 6:
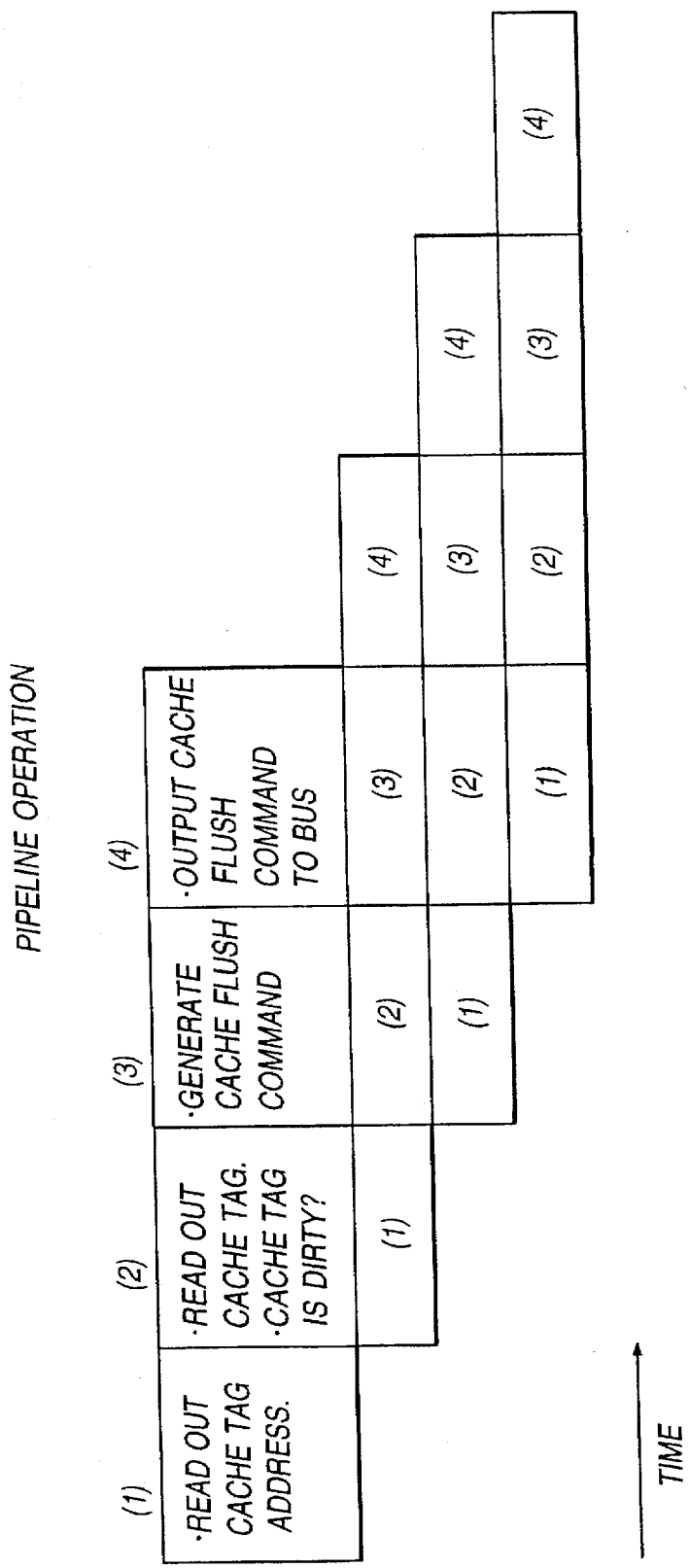
FIG. 6 is a block diagram to explain a pipeline operation in the cache flush device of this invention.

To accelerate the cache flush operation, this embodiment adopts a pipeline processing. Namely, four operations described in FIG. 6 are executed in parallel.

First, the main controller 38 decides whether the pipeline operation is ready (step C1).

If the pipeline operation is ready, the external tag reading device 28 reads the value of the flush start bit and the values set into the loop count register and the start address register of the main controller 38 (steps C2, C3 and C4).

The external tag reading device 28 decides whether the flush start bit is set to "one" (steps C4, C16). If the flush start bit is set to "one", the cache flush operation continues.

In addition, the external tag reading device 28 outputs the start address (r-addr) to the external tag storage device 26. The external tag reading device 28 stores an incremented start address in the start address register of the main controller 38 (step C5).

Moreover, the external tag reading device 28 stores the decremented loop count in the loop count register (steps C3 and C13). If the decremented loop count is not "zero", the cache flush operation is continued (step C14).

On the other hand, the external tag storage device 26 reads the tag (r-tag) corresponding to the address (r-addr) output from the external tag reading device 28. The readout value is output to the external tag inspection device 32 (steps C6–C7). If the tag read is not ready, the pipeline operation is stopped temporarily.

The external tag inspection device 32 decides whether the state of the cache block corresponding to the tag is dirty (step C8). If yes, the external tag inspection device 32 outputs a r-fsh command to the invalid bus command generation device 34.

The invalid bus command generation device 34 generates a coherent invalidate command with the physical address of the tag (a cache flush command:flush) to flush the corresponding cache block, and outputs the command to FIFO 36 (step C9). If FIFO 36 is full at this time, the pipeline operation is stopped, until FIFO 36 has room (step C10).

When the cache flush command is stored in FIFO 36, the bus interface circuit 22 acquires the system bus 18 (step C11), and outputs the cache flush command stored in FIFO 36 to the system bus 18 (step C12).

The above-mentioned cycle is an operation to issue one cache flush command from the cache flush device 20. This cycle is repeated the number of times indicated by the loop count register. If the value of the loop count register is decremented to "zero" (step C14), the external tag reading device 28 resets the flush start bit of the main controller 38 (step C15). As a result, the main controller 38 stops the cache flush operation.

FIG. 6 shows the processing of each stage of the pipeline for the cache flush device 20. This operation proceeds as follows: (1) the cache tag address is read by the external tag reading device 28 (step C2); (2) an r-tag is read from the external tag storage device 26; The state of the cache is decided (steps C7 and C8); (3) the cache flush command is generated by the invalid bus command generation device 34 if the state of the cache is dirty (step C9); and (4) the cache flush command is output (step C11).

In general, a bus command takes a few bus cycles. The pipeline operation from the external tag reading device 28 to the invalid bus command generation device 34 can be executed every bus cycle, if the external tag storage device 26 can be accessed in one bus cycle.

Thus, the pipeline operation enables a cache block tag to read out every bus cycle, while a cache flush command takes several bus cycles.

The discrepancy of the required bus cycles are relieved by FIFO 36. If the number of dirty blocks is small, the required time for the cache flush operation becomes equal to the tag readout time because FIFO 36 does not become full.

Cache flush time=the number of cache blocks (bus cycle).

Therefore, the first embodiment of this invention can save much time for executing a cache flush operation as compared to a processor that repeats cache flush instructions. The cache flush operation as mentioned above is executed by controlling the cache flush device 20 connected to the system bus 18 in the first embodiment of this invention. As for normal operation, the bus command issued onto the system bus 18 is monitored by the cache flush device 20. The cache flush device 20 stores the same tag as cache tag 14 stored in the external tag storage device 26.

When the cache flush operation is executed, the cache flush device 20 inspects the state of the tag and issues the cache flush command to the cache controllers, to write back the dirty block of the cache 16 into main memory 12.

One of the most effective uses of this invention is to acquire a checkpoint in the main memory. A checkpoint is a state where a computer system can start data processing when a fault occurs. To acquire a checkpoint in the main memory, the cache memory should be flushed. When the cache flush device 20 is started at a checkpoint of the computer system by the processor 10, the processor need not execute cache flush instructions by itself.

Moreover, when the cache flush is executed, the cache flush device 20 can execute the cache flush operation, address increment, and counter decrement at the same time. The operation of the cache flush of consecutive cache blocks can be executed by a pipeline operation. Therefore, the required time for the cache flush operation can be greatly shortened.

Next, the second embodiment of this invention is explained.

Figure 7:
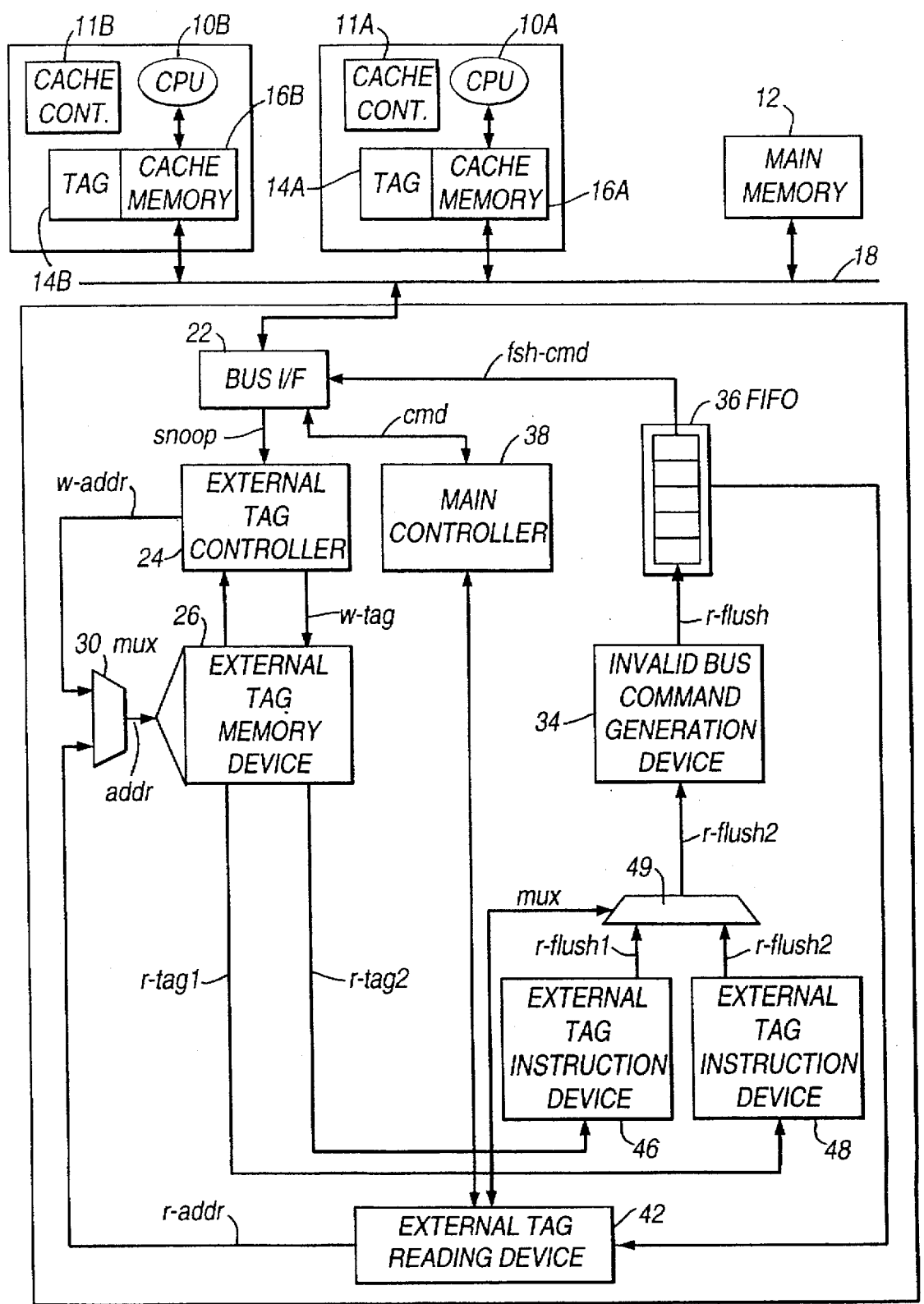
FIG. 7 is a block diagram of the computer system, according to an alternative embodiment of the present invention.

FIG. 7 illustrates the main components of the computer system. The second embodiment, in addition to the elements in the first embodiment, includes means for inspecting two or more tags at the same time. Two external tag inspection devices 46, 48 and a multiplexer 49 (mux) for selecting the output (r-fsh1,r-fsh2) of two external tag inspection devices 46, 48 are added. The number of the external tag inspection devices can be chosen arbitrarily (2–4) is at random. However, because the cache block address is usually represented by a binary number, the number of the external tag inspection devices is a second power.

Since a bus interface circuit (bus I/F) 22, an external tag controller 24, and a multiplexer (mux) 30, an invalid bus command generation device 34, a main controller 38 and FIFO 36 execute the same operation as the first embodiment, the same symbols are assigned to the corresponding components and their explanation is omitted. The external tag inspection devices 46, 48 have the same function as the external tag inspection device 32 in FIG. 2.

An external tag reading device 42 receives a start address and a loop count and the value of the flush start bit from the main controller 38 in the first embodiment. The external tag reading device 42 outputs the start address to the external tag storage device 44 through the multiplexer 30 and calculates the next start address and the decremented loop count. Here, the increment of the start address is the number of the cache block size×the number of the external tag inspection devices. The decrement of the loop count is the number of the external tag inspection devices.

An external tag storage device 44 outputs tags (r-tag1,r-tag2) for the two external tag inspection devices 46, 48 at the same time, according to the address (r-addr) received from the external tag reading device 42.

For instance, as shown in FIG. 7, if the number of the external tag inspection devices is two, the external tag storage device 44 cuts the least significant bit of the cache block address. The external tag storage device 44 reads the even number address and the odd number address read at the same time and outputs them to the external tag inspection devices 46, 48.

The multiplexer (mux) 49 receives the output of the external tag inspection devices 46, 48. If the multiplexer (mux) 49 receives two or more cache flush commands at the same time, it selects an arbitrary one, first. At the next cycle, the multiplexer outputs the remaining cache flush command.

It is recommended that the multiplexer 49 have a buffer (not shown) for stoking an input value temporarily. If the buffer becomes full, the multiplexer 49 stops the processing of the external tag reading device 42 temporarily.

Next, the operation of the second embodiment is explained. As the operation of the bus interface circuit 22, the external tag controller 24, and the external tag storage device 44 is similar to the first embodiment in a normal operation, a further detailed explanation of their operation is omitted.

Figure 8:
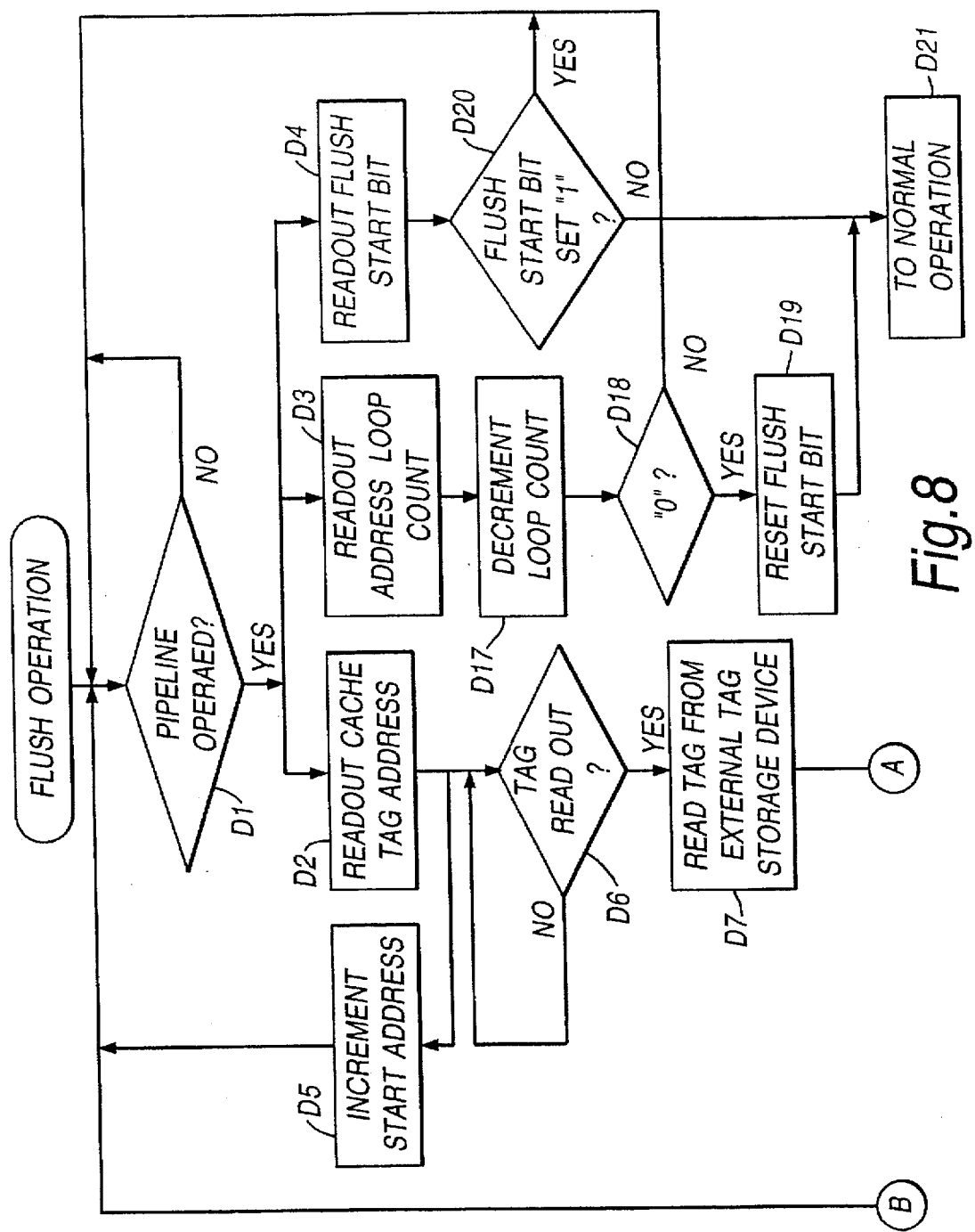
FIG. 8 is a flow chart to explain the operation of the cache flush device when the computer system normally operates, according to an alternative embodiment of the present invention.
Figure 9:
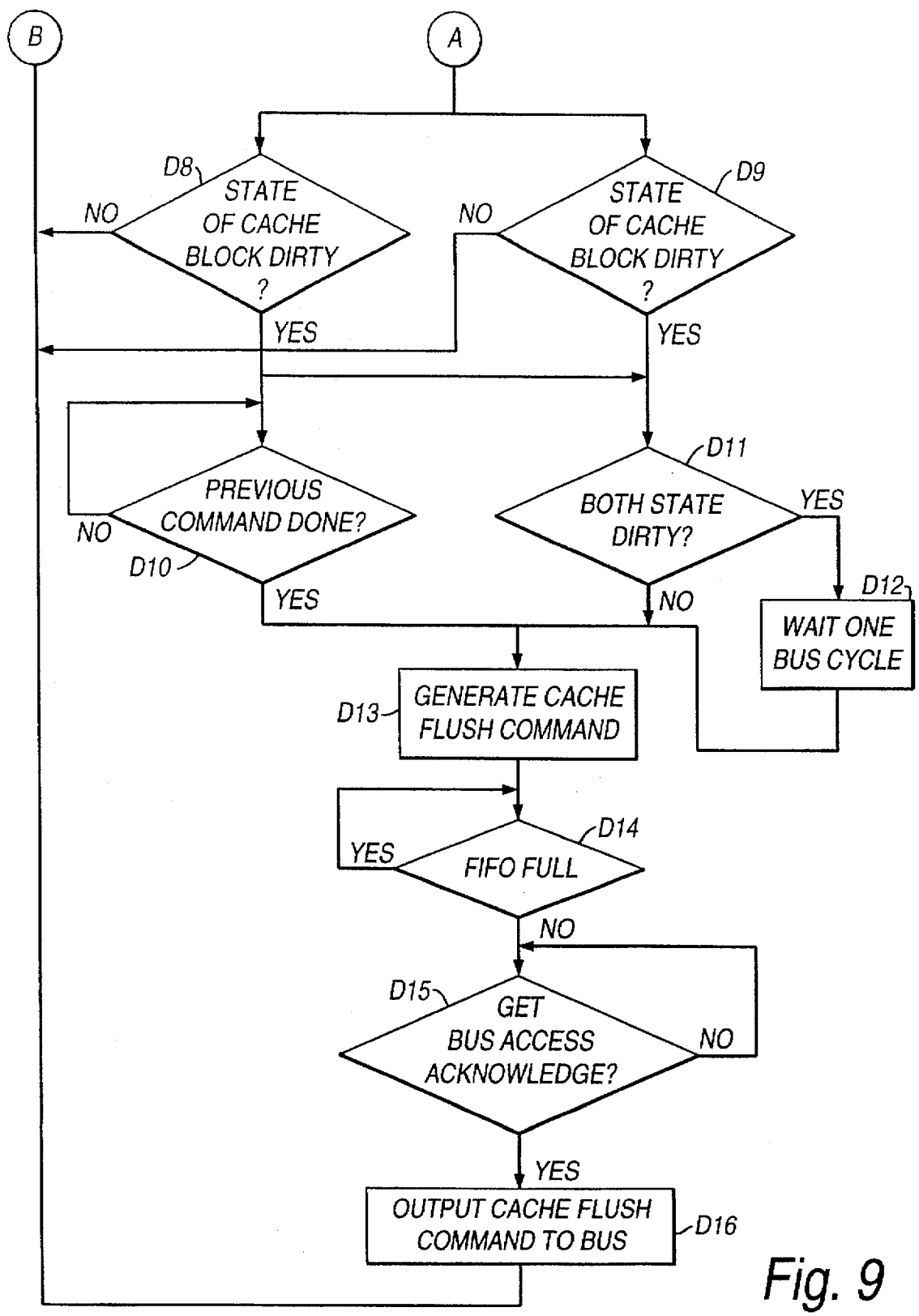
FIG. 9 is a block diagram of the computer system, according to an another alternative embodiment of the present invention.

FIG. 8 and FIG. 9 are flow charts by which the operation in the second embodiment of the cache flush is explained. The cache flush operation repeats the following cycles. The steps D1–D7 and D17–D21 shown in FIG. 8 are the same as the steps C1–C7 and C13–C17 shown in FIG. 5. The cache flush device 40 can execute the pipeline operation as in the first embodiment.

When the processor 10 writes a c"one" in the flush start bit of the main controller 38, the cache flush device 40 begins the cache flush operation.

The external tag reading device 42 reads the contents of the loop count register and the start address register, to execute the pipeline operation. The external tag reading device 42 outputs a start address (r-addr) to the external tag storage device 44 through the multiplexer 30. The incremented start address is written in the start address register at the same time. The decremented loop count is written in the loop count register (steps D1–D5).

The external tag storage device 44 ignores the least significant bit of the tag reading address (r-addr). The tags (r-tag1,r-tag2) are read in the even number address and the odd number address at the same time. The read tags are output to the external tag inspection devices 46, 48 (steps D6–D7).

The situation where these are two external tag inspection devices 46, 48 is explained. If four external tag inspection devices are installed, the external tag storage device 44 disregards the least significant bits of the tag reading address (r-addr). Four tags are read at the same time. The read values are output to the external tag inspection devices.

The external tag inspection devices 46, 48 decide whether the tags read from the external tag storage device 44 are dirty (steps D8–D9). The tags are output to the multiplexer 49, if they show dirty states.

The multiplexer 49 outputs the received tag to the invalid bus command generation device 34. If the multiplexer 49 receives two or more tags at the same time, one of received tags is selected by the multiplexer 49. The remaining tag is output to the invalid bus command generation device 34 at the next bus cycle (step D10–D12).

The invalid bus command generation device 34 generates a cache flush command by using the physical address part of the tag. This is output to FIFO 36 (steps D13–D14).

When the cache flush command is stored in FIFO 36, the bus interface circuit 22 acquires the system bus 18 (step D15). The cache flush command stored in FIFO 36 is output to the system bus 18 (step D16).

This cycle is repeated until the loop count becomes "zero" (steps D17–D21).

As mentioned above, two or more tags are read at the same time from the external tag storage device 44 to the cache tag inspection devices, when the cache flush is operated in the second embodiment. Two or more external tag inspection devices 46, 48 can inspect the dirty state of the tag of the plural cache blocks every bus cycle. Therefore, the cache tag inspection time can be greatly shortened. For instance, the tag readout time of the cache block can be reduced to by half, compared with the first embodiment.

It the case where the number of dirty cache blocks is small, the cache flush time almost becomes equal to the tag readout time.

The cache flush time=the number of the cache blocks/the number of the external tag inspection devices (bus cycle).

The external tag inspection devices 46, 48 are illustrated in FIG. 7. However, the invention is not limited to this configuration. For instance, it is possible that the cache flush device has the same number of invalid bus command generation devices as external tag inspection devices. The output of two or more invalid bus command generation devices is selected by a multiplexer. Moreover, the number of FIFO may be equal to the number of external tag inspection devices. Values output from FIFOs are selected by a multiplexer.

Next, a third embodiment of this invention is explained.

Figure 10:
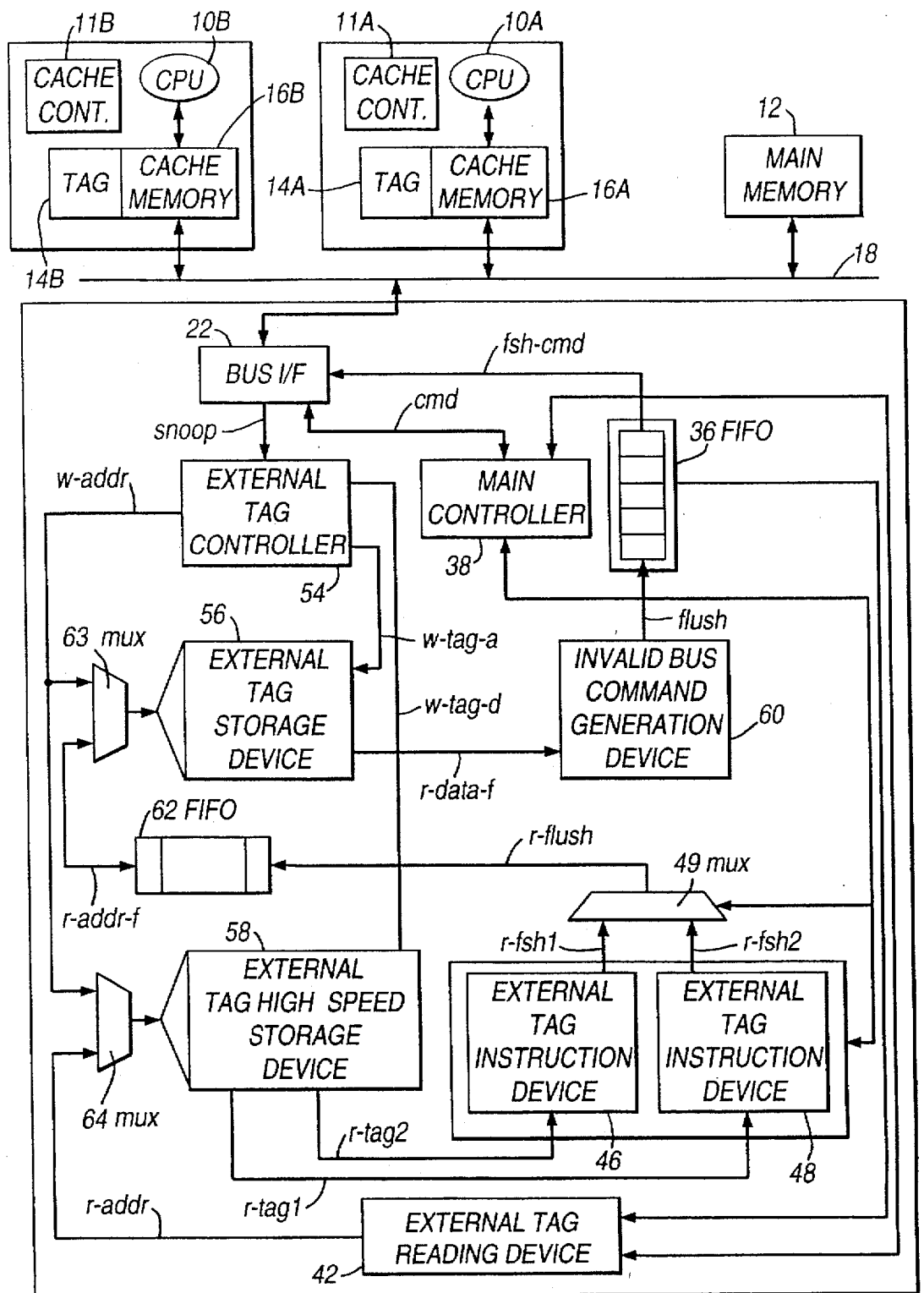
FIG. 10 is a block diagram to explain the operation of the cache flush device when the computer system operates normally, according to an another alternative embodiment of the present invention.

FIG. 10 is a block diagram of the main components of the computer system. In the third embodiment, an external tag high speed storage device 58, FIFO 62 and multiplexer 63 are added to the components of the second embodiment. The third embodiment illustrates these components with two external tag inspection devices 46, 48. However, the invention is not limited to this configuration.

In the third embodiment, the explanation of the external tag reading device 42, the main controller 38, FIFO 36, the bus interface circuits (bus I/F) 22, the invalid bus command generation device 60, and the multiplexer 49 is omitted because it is similar to the second embodiment. The multiplexer 49 selects the output of the two external tag inspection devices 46, 48. The selection result is output to FIFO 62. The multiplexer 64 has the same function as the multiplexer 30 explained with relation to the second embodiment. The selected output is output to the external tag high speed storage device 58.

The external tag controller 54 divides the tag acquired according to the snoop state of the system bus 18 through the bus interface circuit 22 into the part (w-tag-a) corresponding to the physical address and the part (w-tag-d) indicating the state of the cache block. The external tag storage device 56 receives w-tag-a of the physical address that indicates the cache block of the tag output by the external tag controller 54. This is stored in the external tag storage device 56. Moreover, the external tag storage device 56 receives the cache block address (r-addr-f) of the dirty state obtained through the multiplexer 63 from FIFO 62. The external tag storage device 56 reads the physical address (r-data-f) indicating the corresponding cache block, and outputs it to the invalidate bus command generation device 60.

The external tag high speed storage device 58 receives the w-tag-d, the tag which represents the state of the cache block. This value is stored in the external tag high speed storage device 58. The number of cache blocks stored by the external tag high speed storage device 58 is equal to the number of cache blocks of the external tag storage devices 56. In the third embodiment, the external tag high speed storage device 58 stores one bit indicating whether the cache block is dirty, as the state of the cache. This was described in the first and second embodiment. The external tag high speed storage device 58 executes the following two operations. First, the external tag high speed storage device 58 stores a tag (w-addr-d), according to a tag address (w-addr) output by the external tag controller 54. Second, the external tag high speed storage device 58 reads the two tags (r-tag1, r-tag2) at the same time, according to an address (r-addr) output from the external tag reading device The read tags are output to the external tag inspection devices 46, 48.

The external tag inspection devices 46, 48 decide whether the tags (r-tag 1,r-tag 2) read from the external tag high speed storage device 58 are dirty. If the readout tags are dirty, the external tag inspection devices 46, 48 generate cache block addresses from the value of the start address register in the main controller 38 and the lower part address, which is determined by r-tag 1 or r-tag 2. For instance, if the r-tag 1 is the odd side of the tag, the value of the start address register is 10, the r-tag 2 is the even side of tag and both of the readout tags are dirty, (rfsh 1) 11 is output from the external tag inspection device 46 as a cache block address and (r-fsh2) 10 is output from the external tag inspection device 48 as a cache block address.

FIFO 62 is a device that absorbs the difference between the time of the cycle to access the external tag storage device 56 and the time that the multiplexer 49 outputs an address (r-flush). FIFO 62 receives the address (r-flush) of the cache block when the flush operation is executed. The cache block address (r-addr-f) is output to the external tag storage device 56 through the multiplexer 63, based on a timing by which the external tag storage device 56 can receive this information.

The multiplexer 63 selects one of r-addr-f and w-addr. The r-addr-f is the address to read r-data-f from the external tag storage device 56. The w-addr is the address to write a tag (w-tag-a) in the external tag controller 56 writes. The selected cache block address is output to the external tag storage device 56. If the multiplexer 63 receives two requests at the same time, it gives a priority to select the cache block address (w-addr) of the external tag controller 56, and outputs it to the external tag storage device 56.

Next, the operation of the third embodiment is explained. Since the operation of the bus interface circuit 22 is similar to the first above-mentioned embodiment, the detailed explanation is omitted. The external tag controller 54 receives the bus command snooped by the bus interface 22. The external tag controller 54 outputs to the external tag storage device 56 a physical address (w-tag-a), and outputs the state (w-tag-d) of the cache to the external tag high speed storage device 58. The external tag high speed storage device 58 stores this state at the address (w-addr).

Figure 11:
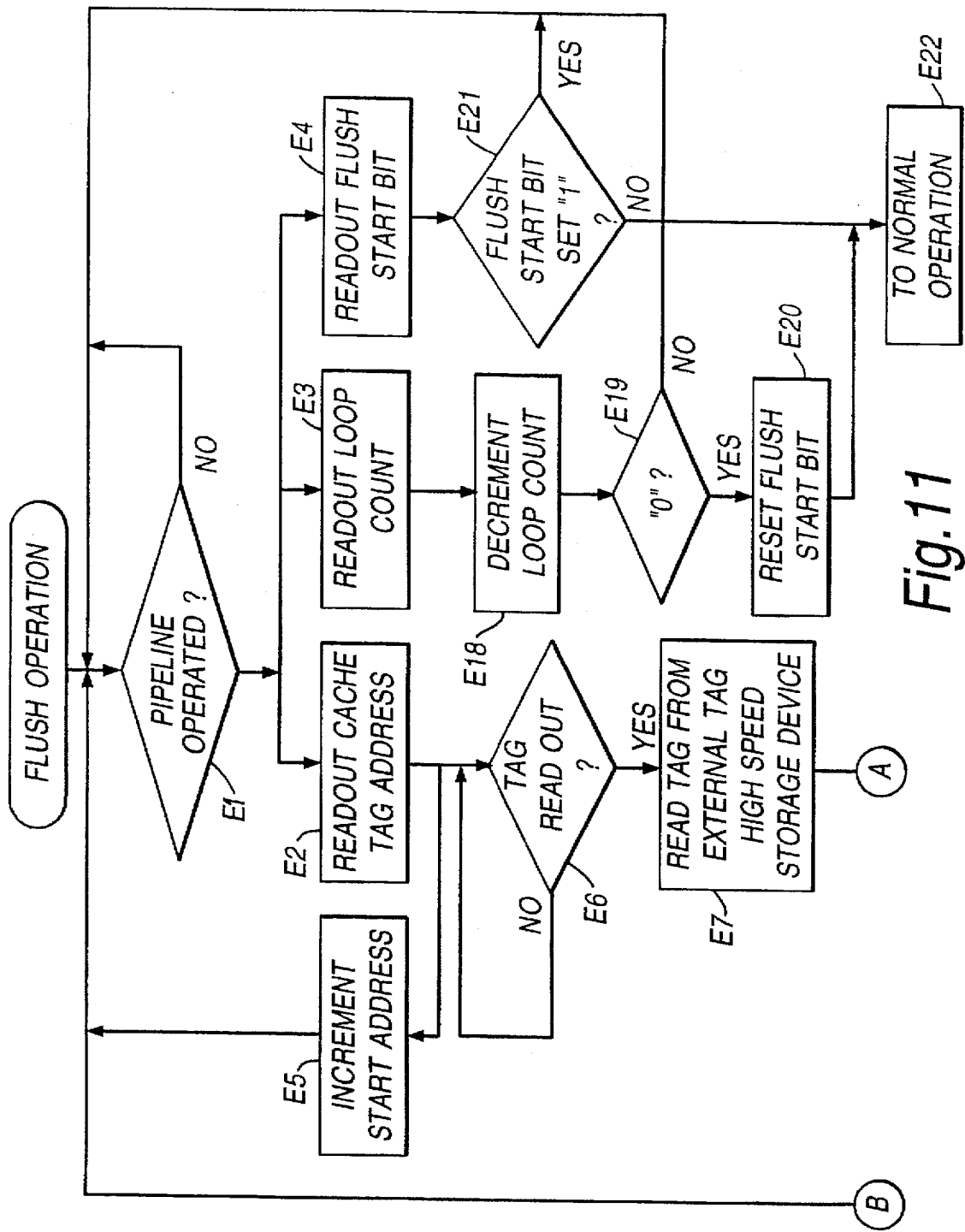
Figure 12:
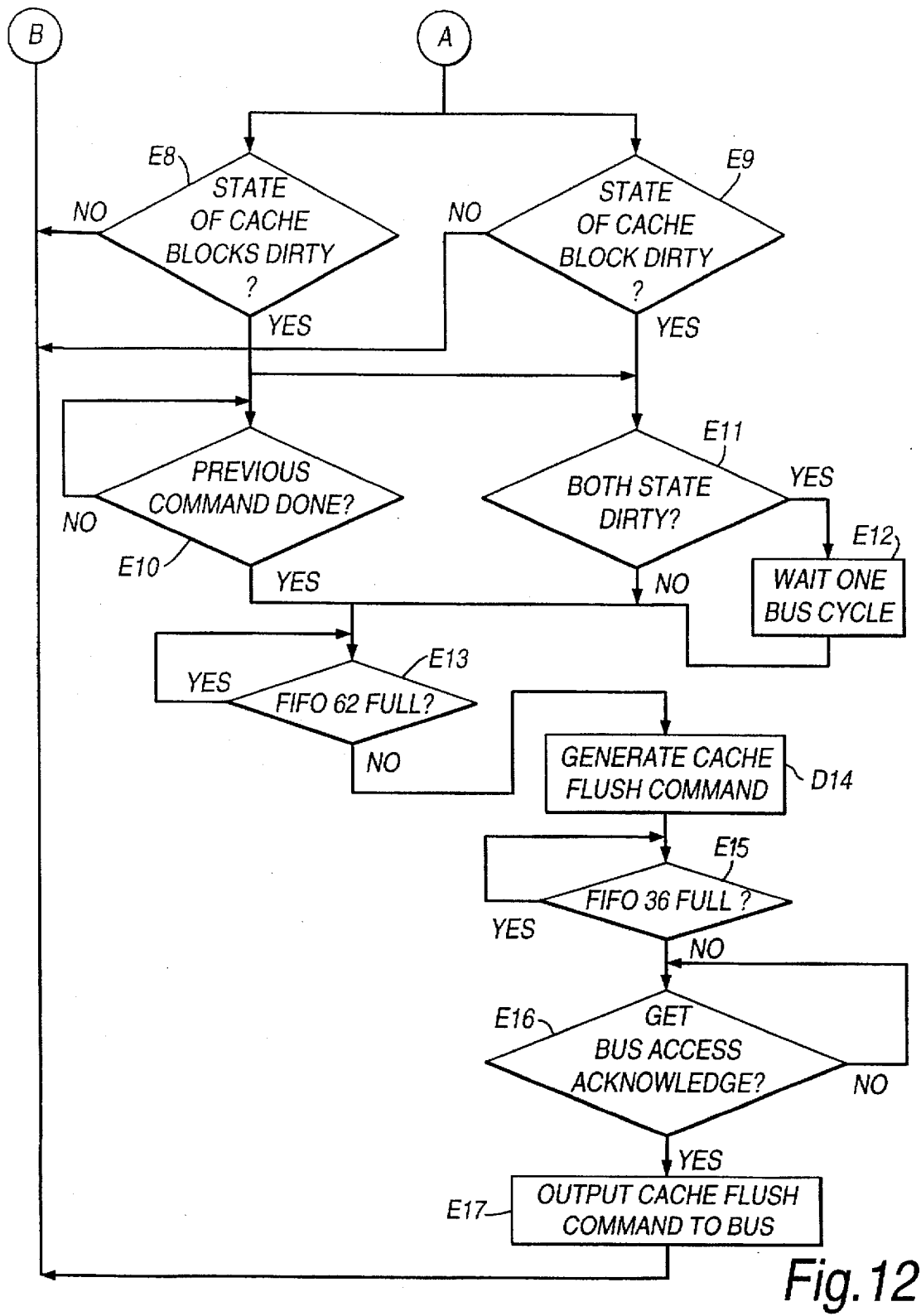

FIG. 11 and FIG. 12 are flow charts by which the operation of the cache flush in the third embodiment is explained. The cache flush operation repeats the following cycles. The processing of steps E1–E6 and E18–E22 shown in FIG. 11 is the same as steps C1–C6 and C13–C17 shown in FIG. 5. Moreover, the cache flush device 50 executes the pipeline operation in the same way as in the first embodiment.

When the processor 10 stores "one" in the flush start bit in main controller 38, the cache flush device 50 begins the cache flush operation.

The external tag reading device 42 reads the contents of the loop count register and the start address register, if the pipeline operation is ready. The external tag reading device 42 stores the incremented start address in the start address register at the same time as outputting a read start address (r-addr) to the external tag high speed storage device 58 through the multiplexer 64. The decremented loop count is stored in the loop count register (steps E1–E5).

The external tag high speed storage device 58 ignores the least significant bit of the tag reading address (r-addr). The odd number address (r-tag1) (the lowest order bit is "one") and the even number address (r-tag2) (the lowest order bit is "zero") are read at the same time by the external tag high speed storage device 58. The readout tags are output to the external tag inspection devices 46, 48 (steps E6–E7).

The external tag inspection devices 46, 48 decide whether the tags read from the external tag high-speed memory device 58 are dirty (steps E8–E9). If the tags are dirty, the external tag inspection devices 46, 48 generate the address of the cache block of the tag and output them to the multiplexer 49.

The multiplexer 49 outputs the address of the received cache block to FIFO 62. If two or more cache block addresses are received at the same time, one of them is selected by the multiplexer 49, first. The remaining address is output to FIFO 62 at the next bus cycle (steps E10–E12).

FIFO 62 outputs the cache block address to the external tag storage device 56 through the multiplexer 63, based on the timing which the external tag storage device 56 reads (step E13).

If the cache block address is received from FIFO 62, the external tag storage device 56 reads a cache block physical address (r-data-f), and outputs it to the invalid bus command generation device 60. The invalid bus command generation device 60 generates a cache flush command from the cache block physical address, and outputs it to FIFO 36 (steps E14–E15).

If the cache flush command is stored in FIFO 36, the bus interface circuit 22 acquires the system bus 18 (step E16). The cache flush command stored in FIFO 36 is output to the system bus 18 (step E17).

This cycle is repeated until the loop count becomes "zero" (steps E18–E22).

As mentioned above, the device for storing the cache tag in the cache flush device 50 is separated into the external tag storage device 56 for storing the physical address and the external tag high speed storage device 58 for storing the state of the cache in the third embodiment of this invention. As a result, the hardware design becomes more flexible because each device may have a different capacity and a different access time storage device.

Namely, the capacity of the external tag high speed storage device is very small (one bit for each cache block), but the whole device should be inspected By contrast, the external tag storage device is large (typically twenty bits for each cache block), but it needs to be read only if the corresponding cache block state is dirty.

It is also possible that the cache flush operation can be executed for a certain specific physical range. For example, it is easy to add to the invalid bus command generation device 60 a function which generates commands having the specified range.

What is claimed is:

1. A computer system for flushing the contents of a cache memory, comprising:

a processor with a cache memory and a tag memory for storing update state information corresponding to the cache;

a main memory;

a system bus for connecting the processor to the main memory;

monitor means, connected to the system bus, for monitoring a bus command on the system bus;

storage means, responsive to the monitor means, for storing the update state information;

reading means for reading the state information stored in the storage means; and command output means, connected to the system bus, for outputting on the system bus an invalid bus command requesting transmission of the updated data from the cache memory to the main memory if the update state information in the storage means indicates that the data in the cache memory has been modified by the processor.

2. A computer system of claim 1, further comprising:

means for detecting whether data transmission by a coherent read command to maintain the coherency between data stored in one cache memory output by one processor and data stored in another cache memory output by another processor is generated from the main memory to the cache memory; and means for executing a response indicating that data targeted by the coherent read command is in a state of sharing, according to the detecting means.

3. A computer system of claim 1, wherein the reading means includes second reading means for reading out a several state information from the storage means, further comprising;

means for determining whether readout data is in an updated state, based on the several state information readout by the second reading means; and command generation means for generating a cache flush command to the system bus, based on a physical address corresponding to the state information determined by the determining means.

4. A computer system of claim 3, further comprising means for issuing a cache flush request to generate the cache flush command of the readout data which is in an updated state, and multiplexer means for selecting one of the cache flush requests and outputting the selected request to the command generation means.

5. A computer system of claim 3, further comprising:

buffer means for storing and outputting the cache flush command generated by the command generation means.

6. A computer system of claim 5, wherein the buffer means includes a first-in and first-out buffer.

7. A computer system of claim 1, wherein the storage means includes first storage means for storing a physical address corresponding to the updated data, and second storage means for storing state information indicating that the data in the cache memory is in an updated state, the reading means including means for reading several state information from the second storage means, further comprising means for determining whether readout data is in an updated state, according to the state information read by the reading means, and command generation means for generating a cache flush command to the system bus if the state information indicates that the data in the cache memory has been changed, based on the state information determined by the determining means.

8. A computer system of claim 7, wherein the determining means includes means for generating two or more cache flush requests, when the state information readout from the second storage means indicates that the data in the cache memory is in an updated state, further comprising multiplexer means for selecting one of the generated cache flush requests, and first buffer means for storing the selected cache flush request and outputting a read address to read a physical address corresponding to the state information determined by the determining means.

9. A computer system of claim 8, wherein the first storage means includes means for reading a physical address corresponding to the output read address, to generate a cache flush command by the command generated means.

10. A computer system of claim 1, further comprising:
means for determining whether data is in a state of updating, based on the state information readout by the reading means; and
command generation means for generating a cache flush command to the system bus, based on a physical address corresponding to the state information determined by the determining means.

11. A computer system of claim 1, wherein the monitor means includes means for outputting a write address to store the physical address and the state information in the storage means.

12. A computer system of claim 11, wherein the reading means includes means for outputting a read address to read the state information from the storage means.

13. A computer system of claim 12, further comprising:
multiplexer means for selecting one of the read address and the write address, the multiplexer means including means for giving a priority to the write address, if the write address and read address are received at the same time.

14. A computer system of claim 12, wherein the monitor means includes a bus interface for sending a bus command issued onto the system bus, further comprising main controller means, coupled to the bus interface, for storing a value of a flush start bit to execute a cache flush operation and a number of a loop count corresponding to a repeated time of the read address, when control data to execute a cache flush operation is set by the processor.

15. A method for flushing a cache memory in a system having a cache memory and a tag memory for storing update state information corresponding to the cache, the method comprising the steps of:

monitoring a bus command on a system bus;

storing in storage means the update state information;

reading the stored state information; and outputting to the system bus an invalid bus command to request transmission of the updated data from the cache memory to the main memory if the data in the cache memory has been modified.

16. A method of claim 15, further comprising the step of storing a flush start bit to execute a cache flush operation and a loop count corresponding to a repeated time of a read address in a control register, when control data is set by a processor, according to the monitoring step.

17. A method of claim 16, further comprising the steps of:

generating a tag read address, based on the loop count and the flush start bit set in the control register; and reading the state information corresponding to the tag read address from the storage means according to the loop count.

18. A method of claim 15, further comprising the step of generating a tag write address to store the physical address and the state information in the storage means.

19. A method of claim 16, further comprising the step of setting a bit to stop a cache flush operation in the control register.

20. A method of claim 17, further comprising the steps of:

decreasing the loop count readout from the control register when the tag read address is generated; and increasing a start address for the tag read address.

* * * * *